Sept. 5, 1961  G. SCHULZ  2,999,158
GAS ANALYSIS BASED UPON ABSORPTION OF INFRARED RAYS
Filed Oct. 1, 1958
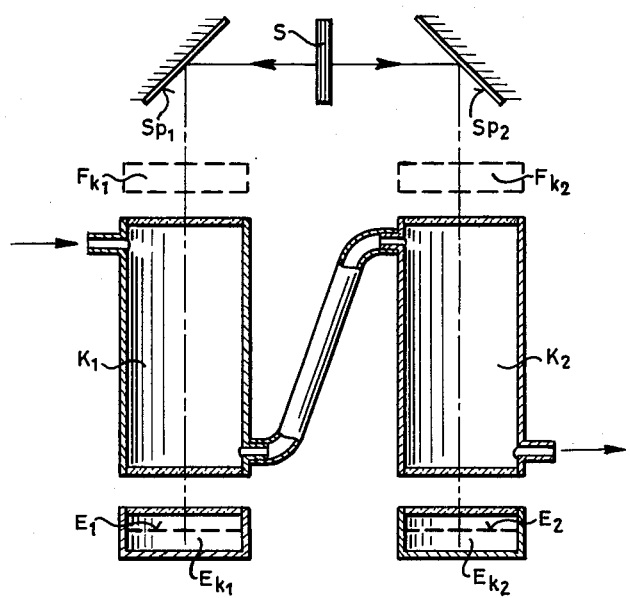
Inventor
Gustav Schulz
By
Atty.

United States Patent Office 2,999,158
Patented Sept. 5, 1961

2,999,158
GAS ANALYSIS BASED UPON ABSORPTION OF INFRARED RAYS
Gustav Schulz, Karlsruhe, Germany, assignor to Siemens and Halske Aktiengesellschaft Berlin and Munich, a German corporation
Filed Oct. 1, 1958, Ser. No. 764,694
3 Claims. (Cl. 250—43.5)

This invention is concerned with a gas analyzing device adapted to determine the composition of gases based upon the absorption of infrared rays by the gas which is being analyzed.

In a known analyzing device of the above noted type, the radiation permeates the gas to be analyzed, passing along two separate paths, and thereupon impacting non-selective black receiver or target members serving for the measuring of the energy difference between the two ray paths. One of the ray paths includes a filter chamber which is filled with the gas contained in the gas mixture to be analyzed so as to determine the portion of such gas contained therein. Such gas shall be referred to as the "sought-for gas." If the sought-for gas is not contained in the gas mixture to be analyzed, the receiver member or target associated with the radiation path including the filter chamber will receive less radiation energy than the target disposed in the other radiation path, because the filter chamber absorbs energy in certain radiation ranges which are characteristic of the sought-for gas. Absorption devices operating in this manner are referred to in the pertinent literature as absorption devices with negative filtering. The measuring effect, that is, the energy difference between the two radiation paths is obtained as difference between relatively great energy portions. In order to avoid this, receivers or targets have been used which were as selective as possible, reacting only with the sought-for gas. Both receiver chambers are, for example, filled with the sought-for gas, and the pressure difference occurring in the receiver chambers due to dissimilar heating thereof is measured as a criterion for the energy difference. If the operation is effected with modulated radiation, a capacitor microphone may be used for indicating the pressure difference. If the sought-for gas is in such case not contained in the gas mixture to be analyzed, the receiver in the radiation path with the filter chamber containing the sought-for gas will in an ideal case not respond, since the filter chamber has already absorbed the radiation ranges to which the receiver is sensitive. The receiver in the other radiation path will respond because the gas filling of the receiver absorbs energy in the spectral ranges which are characteristic for the sought-for gas. Depending upon the amount of the sought-for gas contained in the gas to be analyzed, energy in the regions characteristic for the gas will also be absorbed in the radiation path that does not contain a filter chamber. In the described devices, the receivers select from the infrared spectral range only those ranges in which appear absorption lines of the sought-for gas, thereby avoiding the difference-formation of great energy portions.

As already mentioned, a filter chamber is to be inserted in one radiation path, which absorbs all the areas of the ultrared spectral range which are characteristic for the sought-for gas. In order to avoid error effects that may occur due to non-symmetries in the radiation paths, an auxiliary chamber is inserted in the other radiation path which is in shape and dimensions similar to the filter chamber, and such auxiliary chamber is filled with a neutral gas. This auxiliary chamber causes loss of radiation energy and reduces the measuring sensitivity. The invention provides a device operating in accordance with the identical radiation method, that is, the two radiation paths are continuously permeated by the radiation. The gas which is to be analyzed is present in both radiation paths; electric thermometers or heat responsive wires serve as receivers disposed in gas-filled receiver chambers. In accordance with the invention, one receiver chamber is constructed as a selective receiver and filled with the sought-for gas, while the other chamber is filled with a neutral gas and operates as a non-selective receiver. Assuming that both receiver chambers are equipped with identically constructed temperature measuring devices, the measuring error will be completely compensated in the electrical difference circuit thereof, due to the non-selective radiation absorption upon the surface of the receivers.

The foregoing and further objects and features will appear from the description of an embodiment shown schematically in the accompanying drawing.

Referring now to the drawing, the radiation from the source S is directed over two similarly constructed mirrors $Sp1$ and $Sp2$ which deflect the radiation to permeate the analyzing chambers K1 and K2. The gas to be analyzed flows through both of these chambers; it need not flow through the chambers successively as shown but may be conducted therethrough along separate paths over respectively separate inlets and outlets. In the receiver chambers $Ek1$ and $Ek2$ are disposed temperature sensing means, for example, platinum wires respectively indicated at E1 and E2, such sensing means being well known and therefore merely schematically indicated. The chamber $Ek1$ is filled with the sought-for gas and the chamber $Ek2$ contains a neutral gas, for example, nitrogen. Ahead of the chambers K1 and K2, indicated in dash lines marked $Fk1$ and $Fk2$, are indicated filter chambers which required in previously known devices; one of these chambers being filled with the sought-for gas and the other with a neutral gas. The invention eliminates these chambers, resulting in a simpler structure while increasing the measuring sensitivity, assuming the same radiation energy, because radiation losses caused by these chambers are likewise eliminated.

The gas used in the non-selective receiver chamber $Ek2$ is a gas having a heat conductivity corresponding at least approximately to that of the gas contained in the selective chamber $Ek1$.

The zero or normal point of the device according to the invention depends—as in all devices which operate with negative filtering—upon the radiation temperature and such temperature must therefore be held as constant as possible. The influence of the radiation temperature will, however, be reduced when using for the filling of the non-selective chamber $Ek2$ in suitable concentration a gas, adapted to absorb infrared radiation, but which is not contained in the gas mixture to be analyzed and whose absorption areas do not overlap with those of the gas being analyzed. The use of such a gas in the non-selective chamber, if it can be found for the gas to be analyzed, will retain the zero point of the device even in the presence of temperature fluctuations of the source, because, in such a case, practically the same energy portion from the spectrum of the source will be absorbed in both receiver chambers, avoiding the occurrence of temperature differences between the receiver chambers E1 and E2.

Changes may be made within the scope and spirit of the appended claims which define what is believed to be new and desired to have protected by Letters Patent.

I claim:
1. A device for determining the composition of gases based upon absorption of infrared radiation by the gas to be analyzed, comprising means forming two radiation paths which are continuously permeated by infrared radiation, each radiation path extending through a portion of the gas to be analyzed, means forming a receiver chamber aligned with each radiation path, one of said receiver chambers containing an amount of the sought-for gas and constituting a selective receiver for the radiation in the corresponding radiation path, and the other receiver chamber containing a neutral gas and constituting a non-selective receiver for the radiation in the other radiation path, each receiver chamber containing a metallic member which presents a relatively small area as seen in the direction of the respective radiation path and functioning as a sensing element responsive substantially solely to the temperature of the gas respectively contained therein.

2. A device according to claim 1, wherein the neutral gas contained in one of said receiver chambers has a heat conductivity which corresponds at least approximately to that of the gas to be analyzed.

3. A device according to claim 1, wherein the gas contained in said non-selective receiver chamber is a gas which is not contained in the gas mixture to be analyzed and the absorption areas of which do not overlap with those of the gas to be analyzed.

References Cited in the file of this patent

UNITED STATES PATENTS 2,674,696    Smith et al.  ---------------  Apr. 6, 1954

OTHER REFERENCES

Fastie et al.: Selective Infra-Red Gas Analyzers, Journal of The Optical Society of America, October 1947, vol. 37, No. 10, pages 762 to 768.